(12) United States Patent
Agarwal et al.

(10) Patent No.: US 6,308,252 B1
(45) Date of Patent: Oct. 23, 2001

(54) PROCESSOR METHOD AND APPARATUS FOR PERFORMING SINGLE OPERAND OPERATION AND MULTIPLE PARALLEL OPERAND OPERATIONS

(75) Inventors: Rakesh Agarwal, Palo Alto; Kamran Malik, San Jose, both of CA (US); Tatsuo Teruyama, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/244,443

(22) Filed: Feb. 4, 1999

(51) Int. Cl.[7] ..................................................... G06F 15/80
(52) U.S. Cl. ................................. 712/22; 712/20; 712/200
(58) Field of Search ................................. 712/20, 22, 200

(56) References Cited

U.S. PATENT DOCUMENTS 5,150,290 * 9/1992 Hunt ....................................... 708/520
5,852,726 * 12/1998 Liu et al. ............................... 712/200
6,122,725 * 9/2000 Roussel et al. ....................... 712/200

OTHER PUBLICATIONS

M.J. Flynn, "Some Computer Organizations and their Effectiveness", IEEE Tran. Comput., C–21, 1972, 948–960.

* cited by examiner

Primary Examiner—Kenneth S. Kim
(74) Attorney, Agent, or Firm—Gray Cary Ware & Freidenrich LLP

(57) ABSTRACT

A processor includes n-bit (e.g., 128-bit) register circuitry for holding instruction operands. Instruction decode circuitry decodes processor instructions from an instruction stream. Arithmetic logic (AL) circuitry is operable to perform one of a single operation on at least one m-bit maximum (e.g., 64-bit) operand provided from the n-bit register circuitry, responsive to a first single processor instruction decoded by the instruction decode circuitry, wherein m<n. In addition, the AL circuitry is operable to perform multiple parallel operations on at least two portions of one n-bit operand provided from the n-bit register circuitry. The multiple parallel operations are performed responsive to a second single instruction decoded by the instruction decode circuitry.

33 Claims, 18 Drawing Sheets

Processor Block Diagram

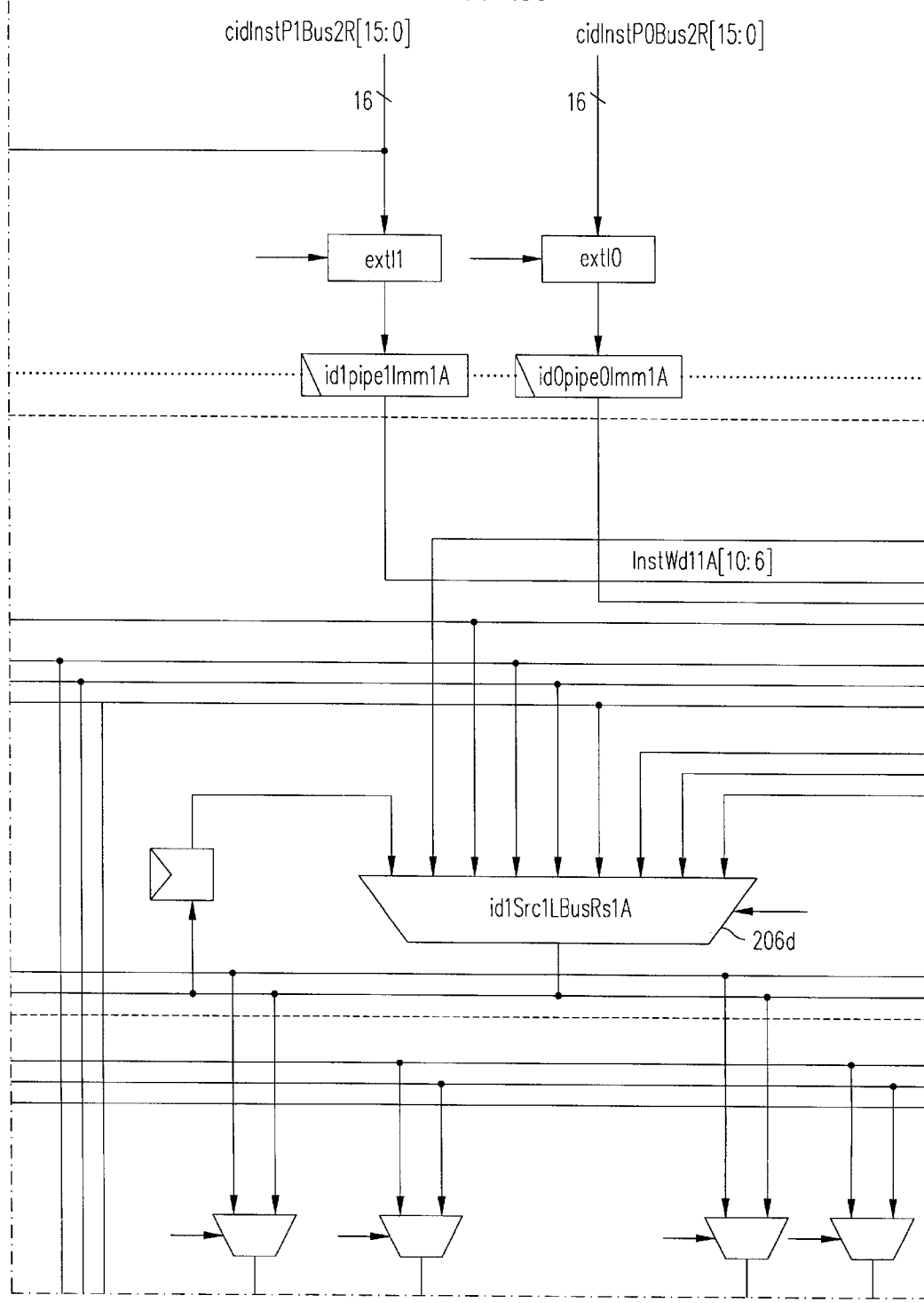

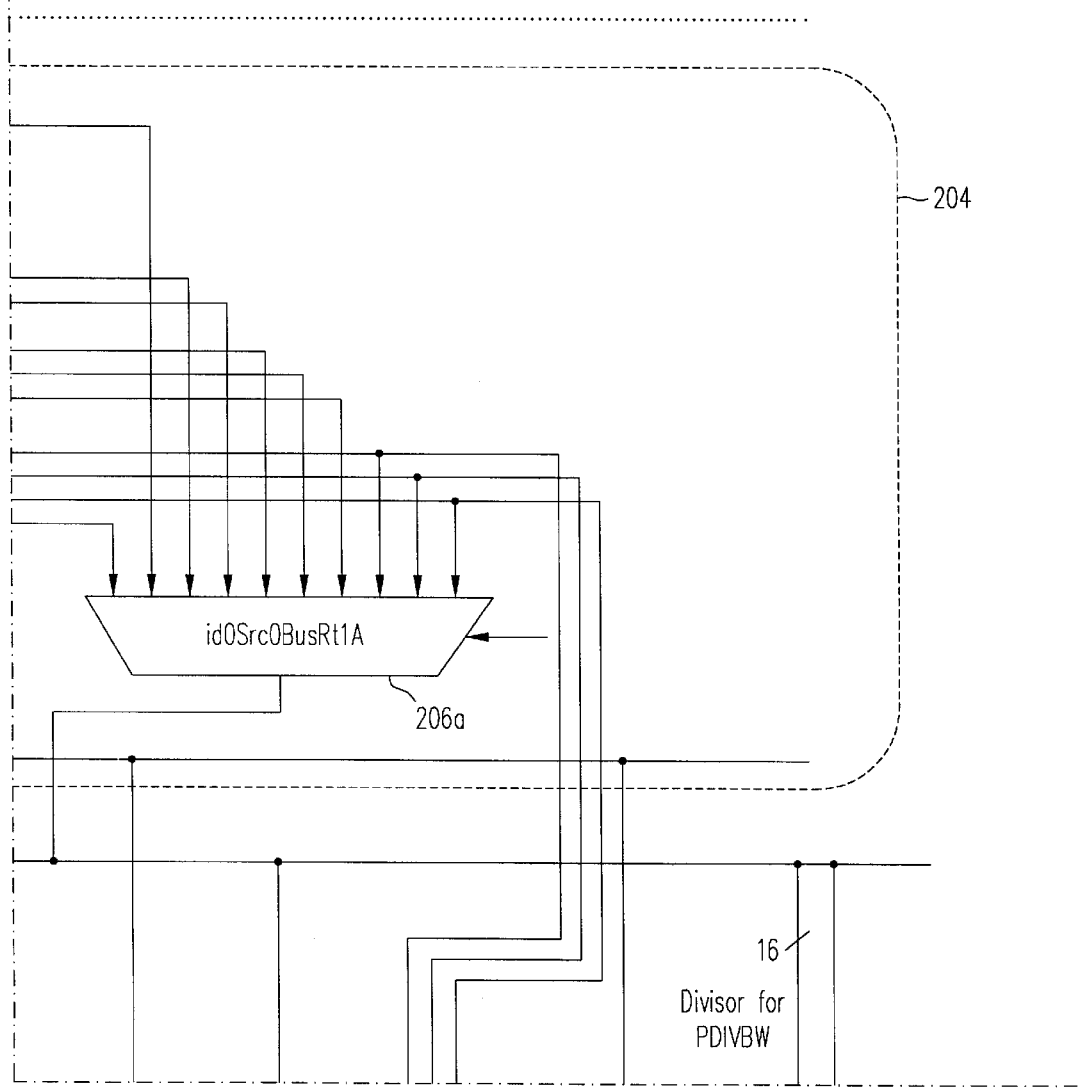

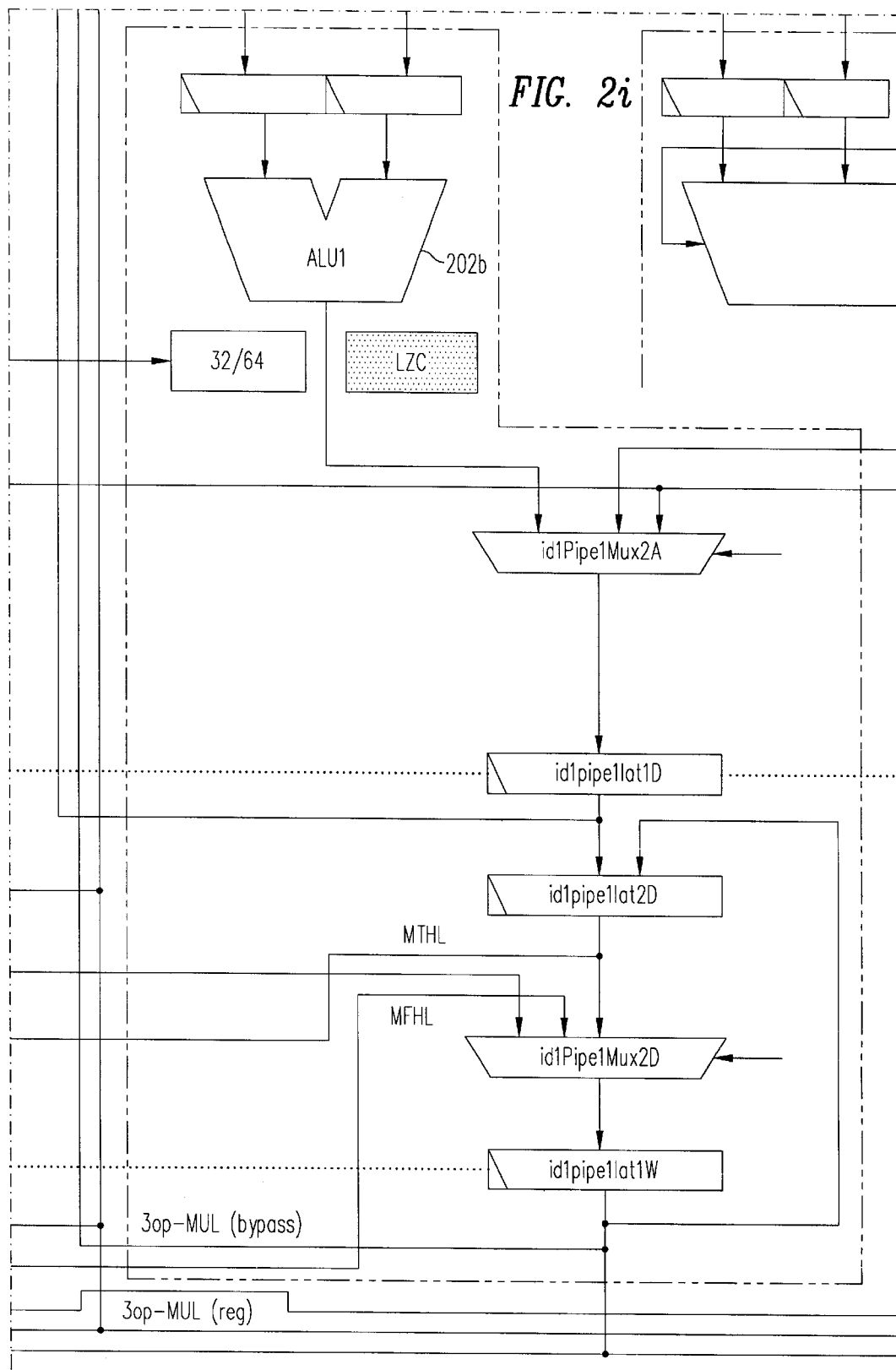

PROCESSOR METHOD AND APPARATUS FOR PERFORMING SINGLE OPERAND OPERATION AND MULTIPLE PARALLEL OPERAND OPERATION

TECHNICAL FIELD

The present invention relates to microprocessors and, in particular, to a microprocessor that has at least one standard datapath for single instruction stream, single data stream (SISD) instructions, but an enhanced datapath for single instruction, multiple data streams (SIMD) instructions.

BACKGROUND

In 1972, Flynn classified processors based on the flow of instructions and data. See Flynn, M. J., "Some Computer Organizations and Their Effectiveness", IEEE Trans. Comput., C-21, 1972, 948–960. The four basis classes of processors are:

SISD, for Single Instruction, Single Data
SIMD, for Single Instruction, Multiple Data
MIMD, for Multiple Instruction, Multiple Data
MISD, for Multiple Instruction, Single Data.

The present patent application deals with SISD and MIMD.

Briefly, simple scalar machines appear as SISD computers. That is, SISD computers have both single instruction and data streams. While SIMD computers also have a single instruction stream, decoded in a single command decoder unit, SIMD computers have multiple data streams.

One early example of a SIMD microprocessor is the Intel i860, a 32-bit reduced instruction set computer (RISC) processor that allows each of its 32-bit general register to be viewed as a concatenation of separate smaller-width data quantities (e.g., four 8-bit data quantities), with no connection between those smaller-width data quantities. The i860 is actually a hybrid SISD/SIMD machine. Specifically, the i860 can operate on 32-bit data quantities in response to a single instruction (single instruction, single data, or SISD); or the i860 can operate on four 8-bit data quantities in parallel, also in response to a single instruction (thus the name single instruction, multiple data, or SIMD). Significantly, the i860 32-bit (maximum) SISD data path is of equal size to the 32-bit (maximum) SIMD data path. Similarly, other SISD/SIMD machines, such as the Sun SPARC (from Sun Microsystems, of Mountain View, Calif.), the DEC Alpha (from Compaq Computer Corporation of Dallas, Tex.) and the HP Precision Architecture (from Hewlett Packard Company of Palo Alto, Calif.) are also configured such that the SIMD data path is of equal size to the maximum SISD data path.

A disadvantage of this approach (the SIMD data path being of equal size to the SISD data path) is that the maximum size of the SIMD data path is limited by the size of the SISD data path, thus correspondingly limiting the amount of multiple data items (or, more correctly, the aggregate size of the multiple data items) that can be operated upon in response to a single instruction. That is, taking the example of the i860, the 32-bit size of the SIMD data path is limited to the 32-bit size of the non-SIMD data path.

SUMMARY

A processor includes n-bit (e.g., 128-bit) register circuitry for holding instruction operands. Instruction decode circuitry sequentially decodes processor instructions from an instruction stream. Arithmetic logic (AL) circuitry is operable to perform one of a single operation on at least one m-bit maximum (e.g., 64-bit maximum) operand provided from the n-bit register circuitry, responsive to a first single processor instruction decoded by the instruction decode circuitry, wherein m<n for any m. In addition, the AL circuitry is operable to perform multiple parallel operations on at least two portions of the one n-bit operand provided from the n-bit register circuitry. The multiple parallel operations are performed responsive to a second single instruction decoded by the instruction decode circuitry.

DETAILED DESCRIPTION

In accordance with one basic aspect of the present invention, a processor is provided having not only at least one "standard" sized datapath for single-instruction, single-data (SISD) operations, but also having an enhanced sized datapath (i.e., larger than the SISD datapath) for single-instruction, multiple-data (SIMD) operations. Details of this aspect are described below with reference to an embodiment in accordance with the invention.

Figure 1:
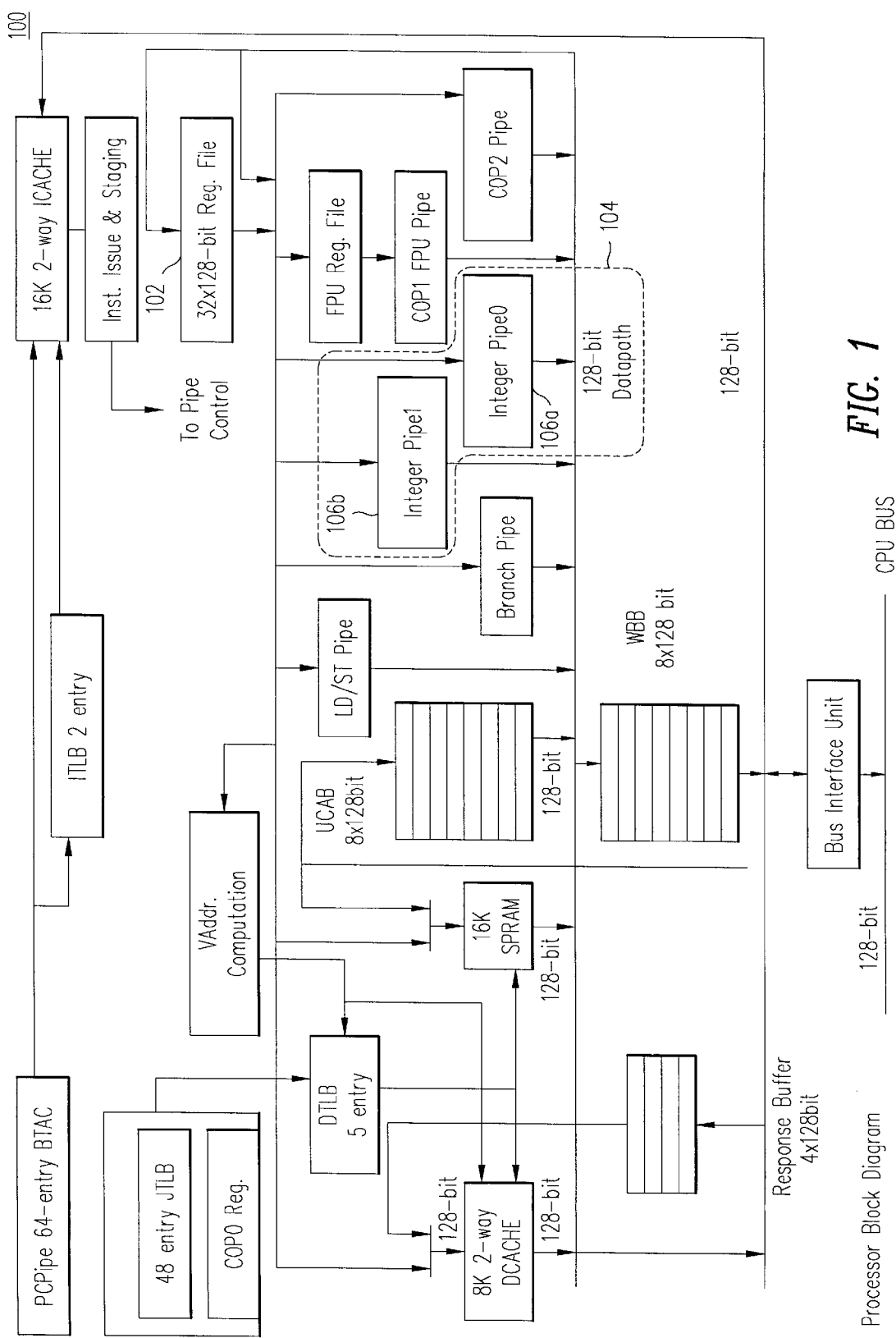
FIG. 1 is a block diagram illustrating an example of a processor that embodies the invention.
Figure 2A:
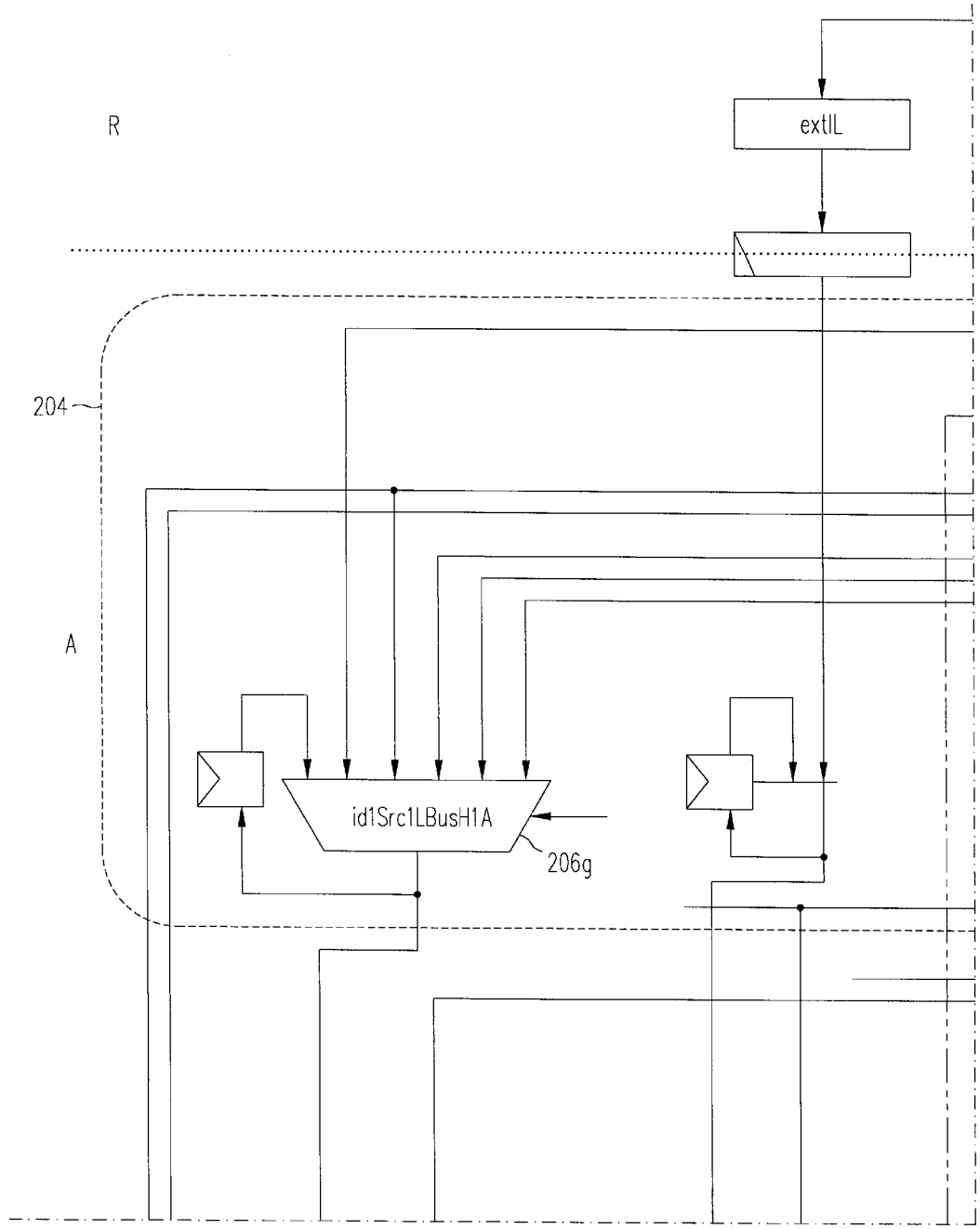
FIG. 2 is a more detailed block diagram that illustrates some details of the integer pipes of the FIG. 1 processor.
Figure 2B:
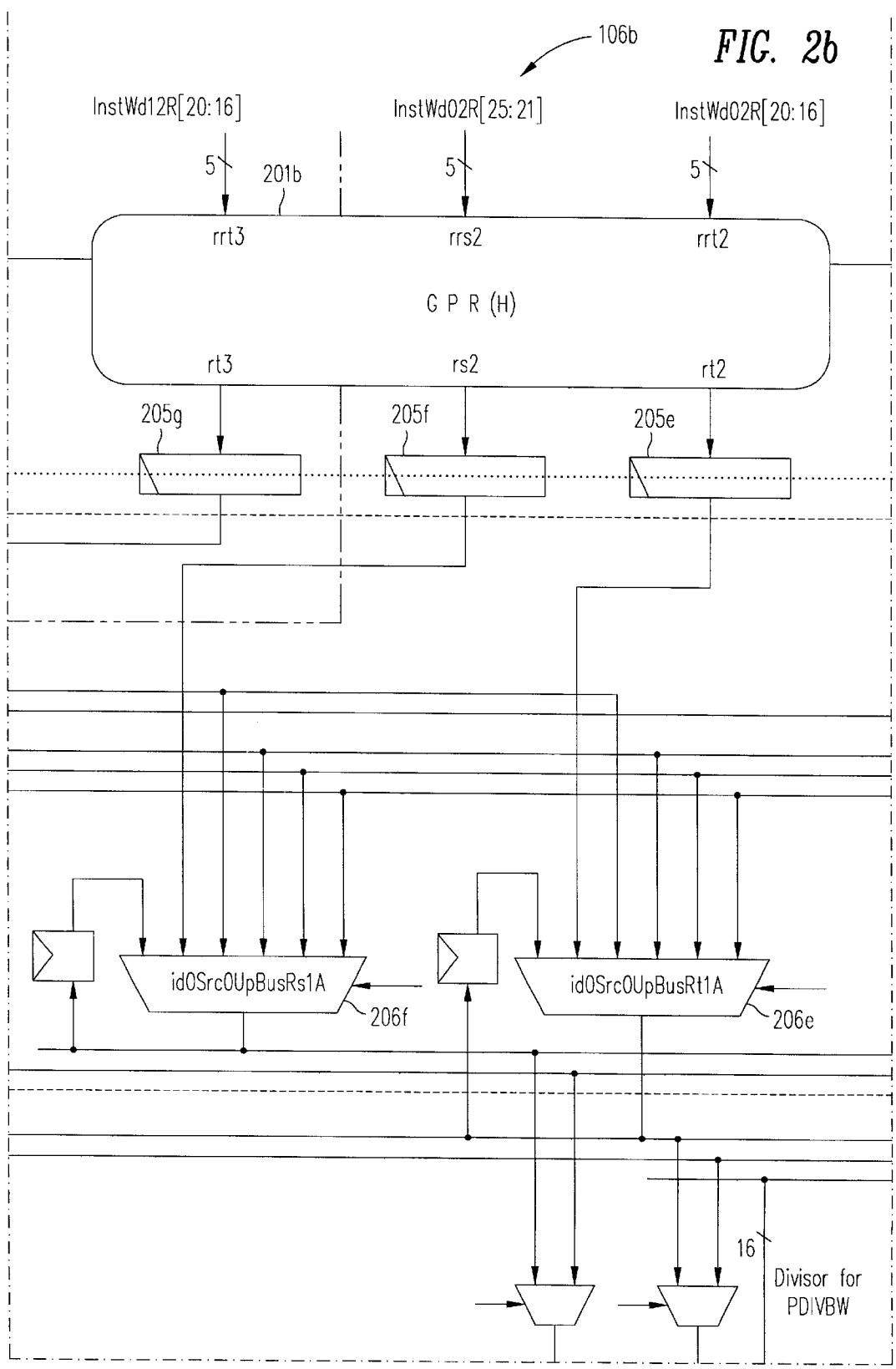
Figure 2D:
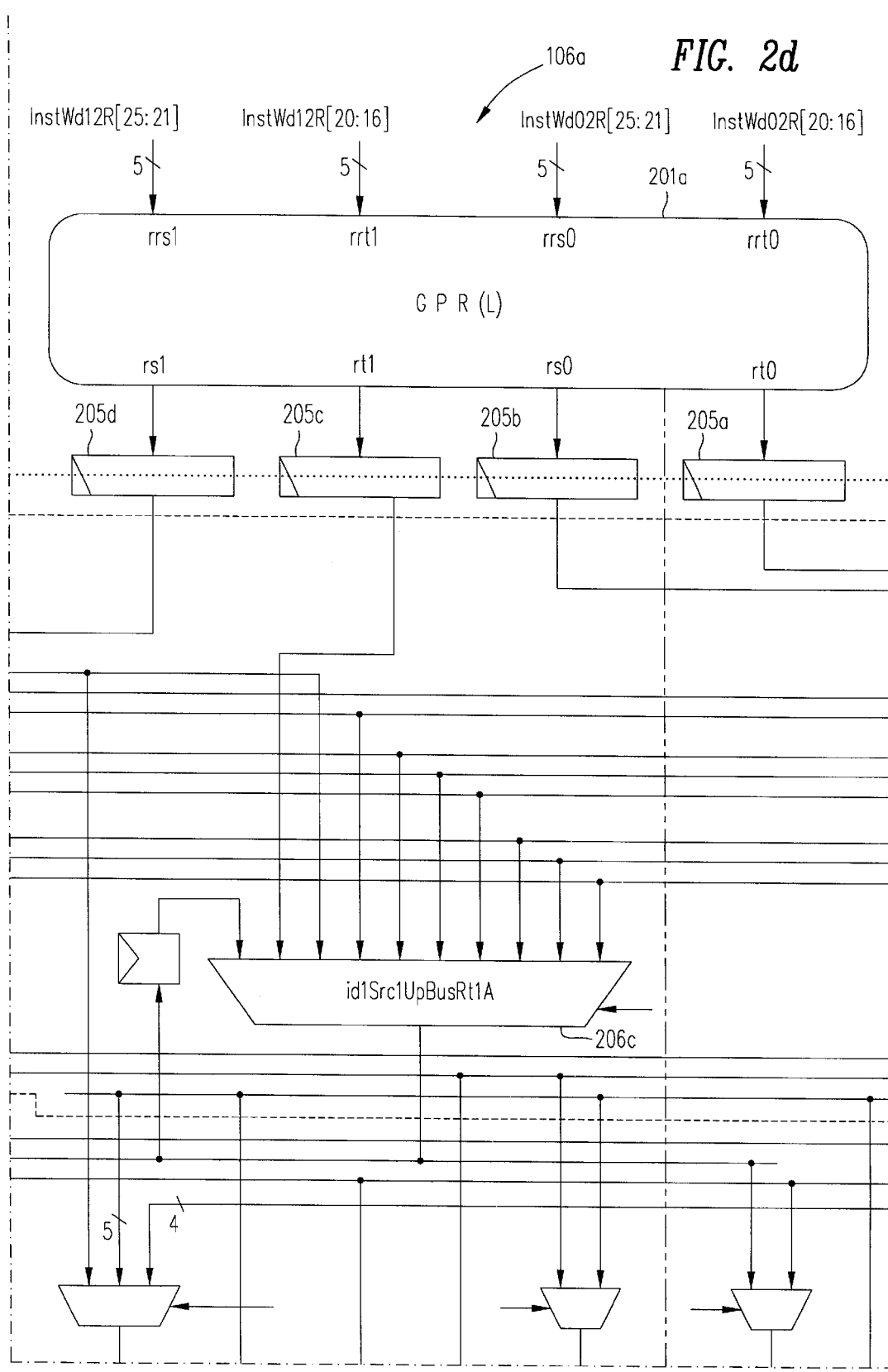
Figure 2E:
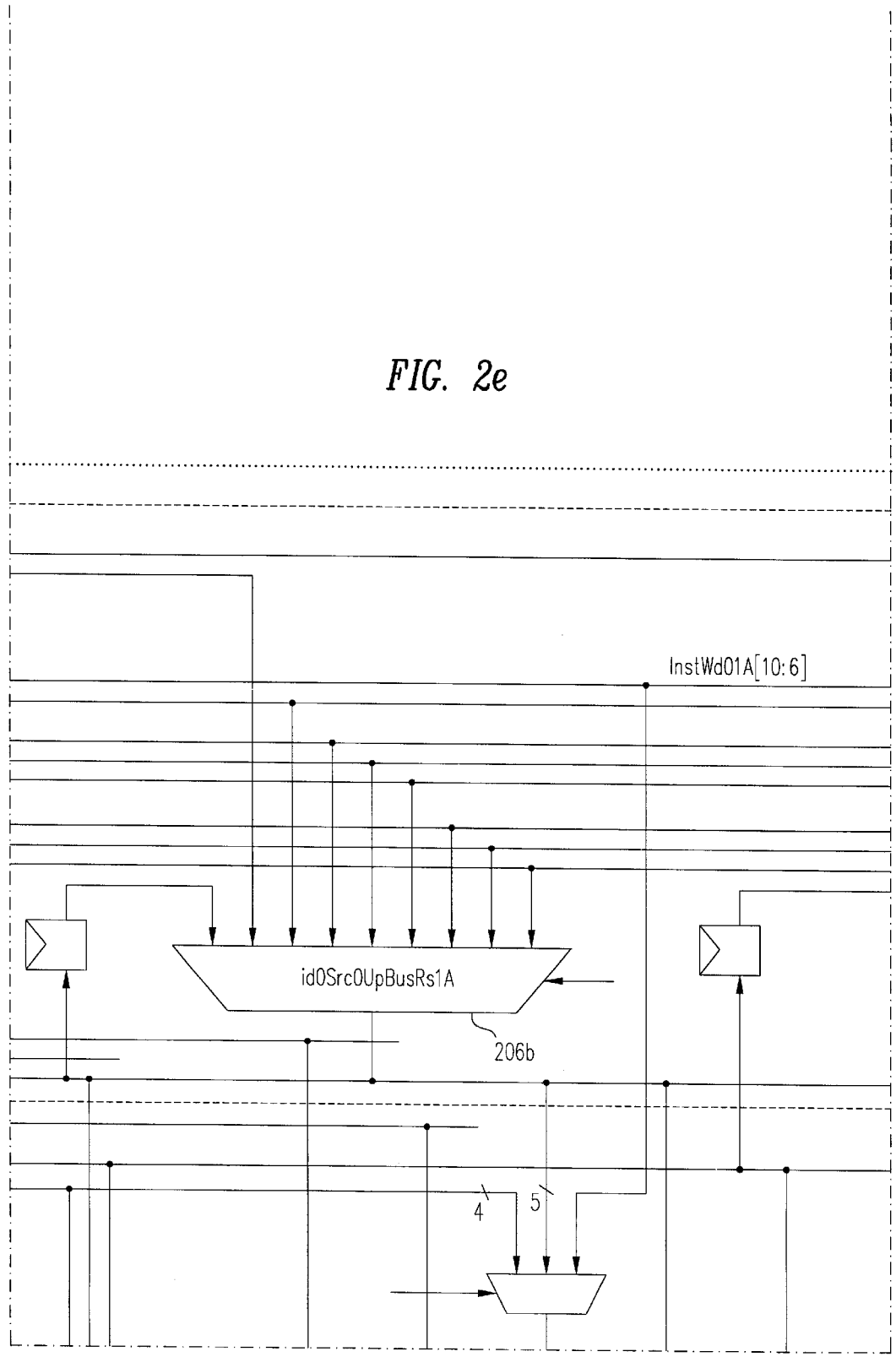
Figure 2G:
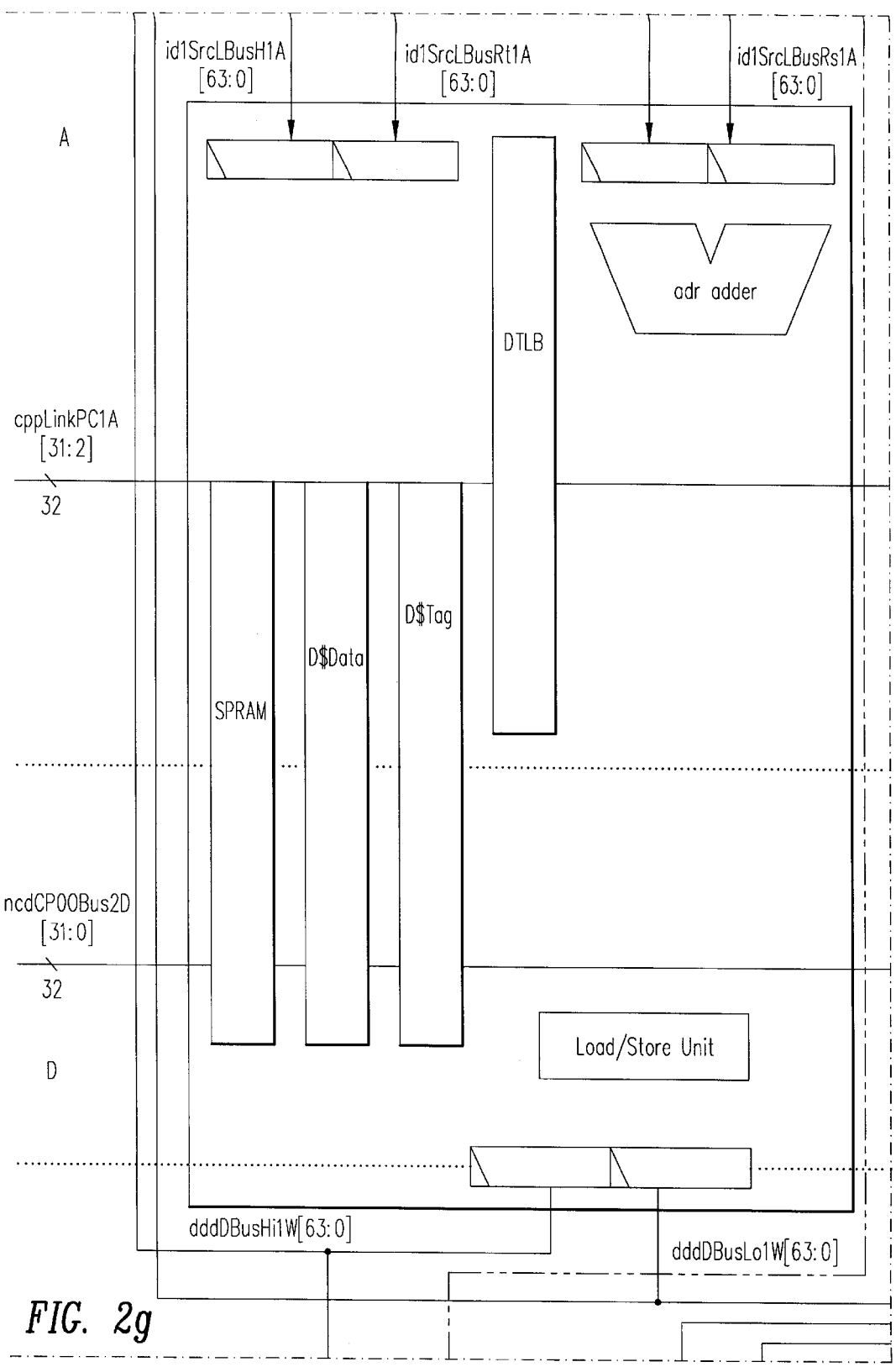
Figure 2H:
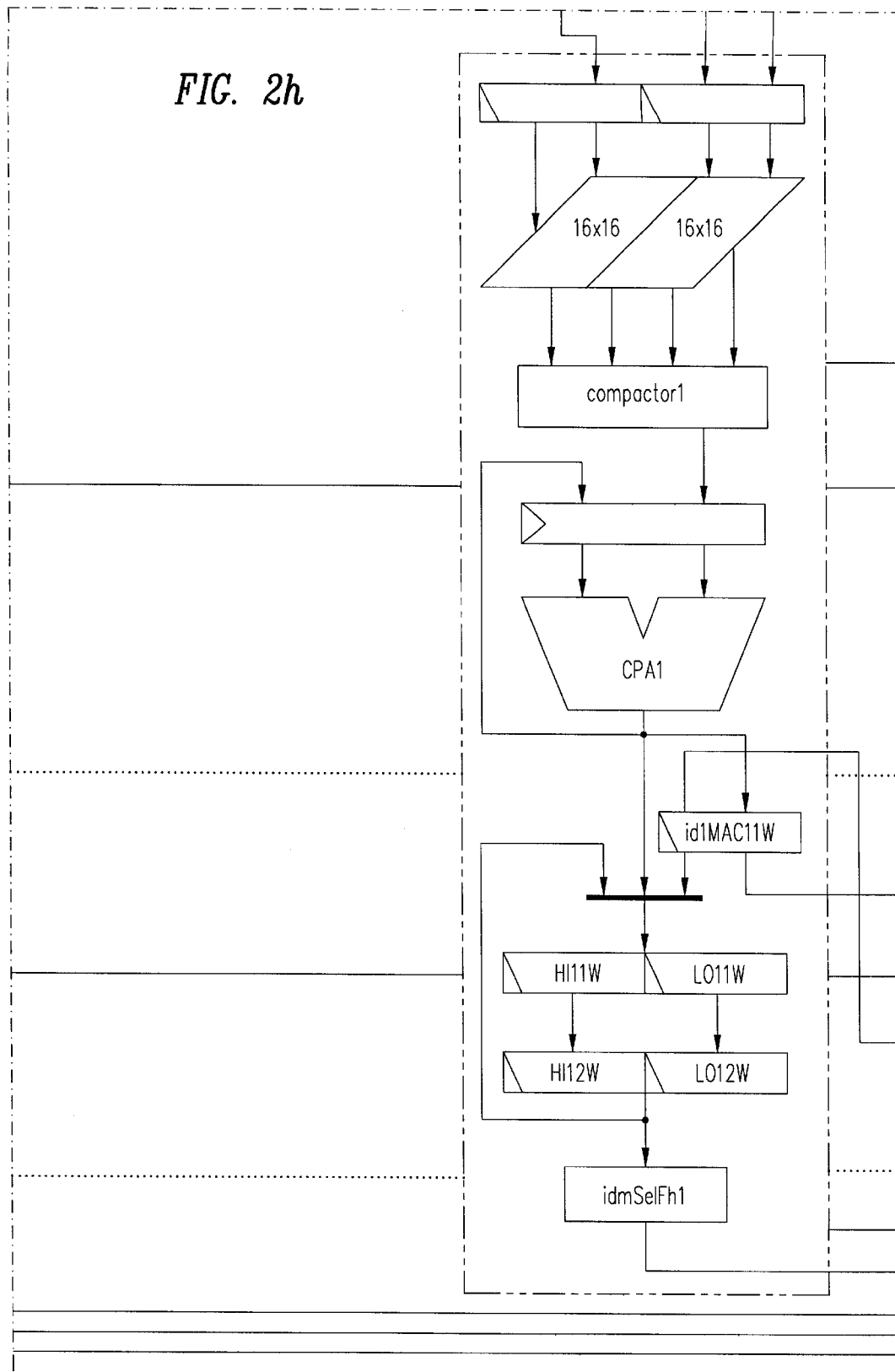
Figure 2J:
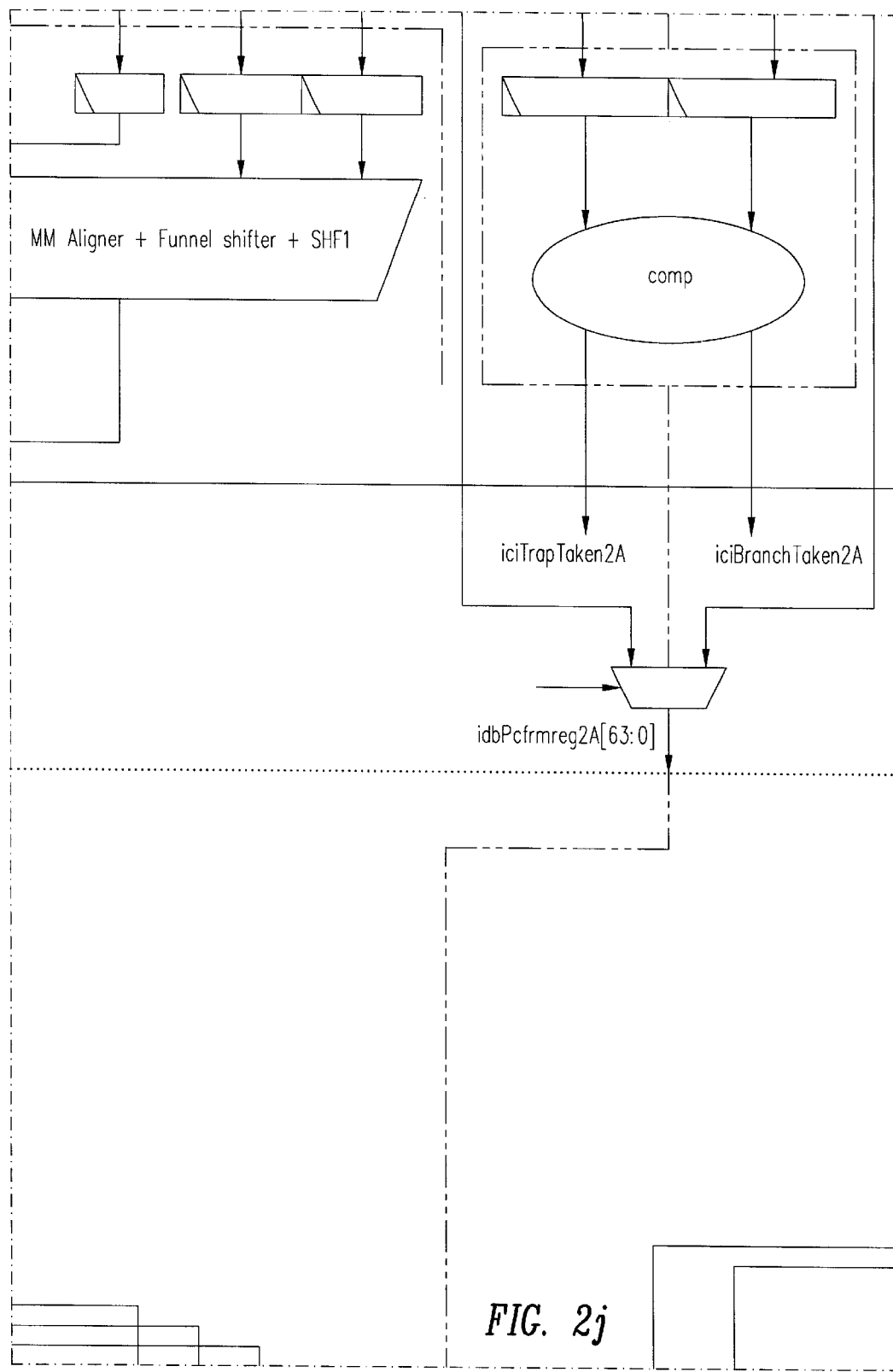
Figure 2K:
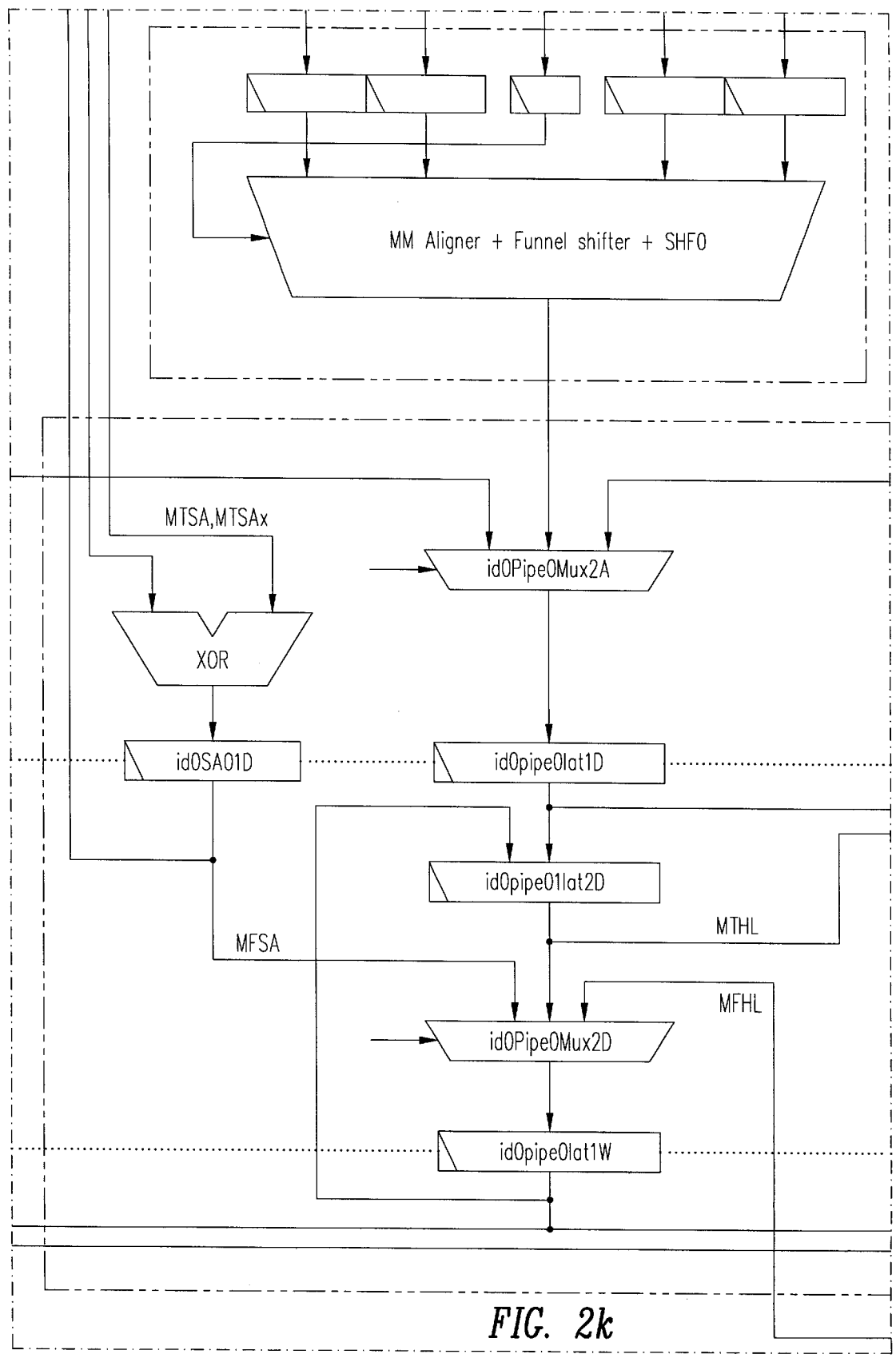
Figure 2L:
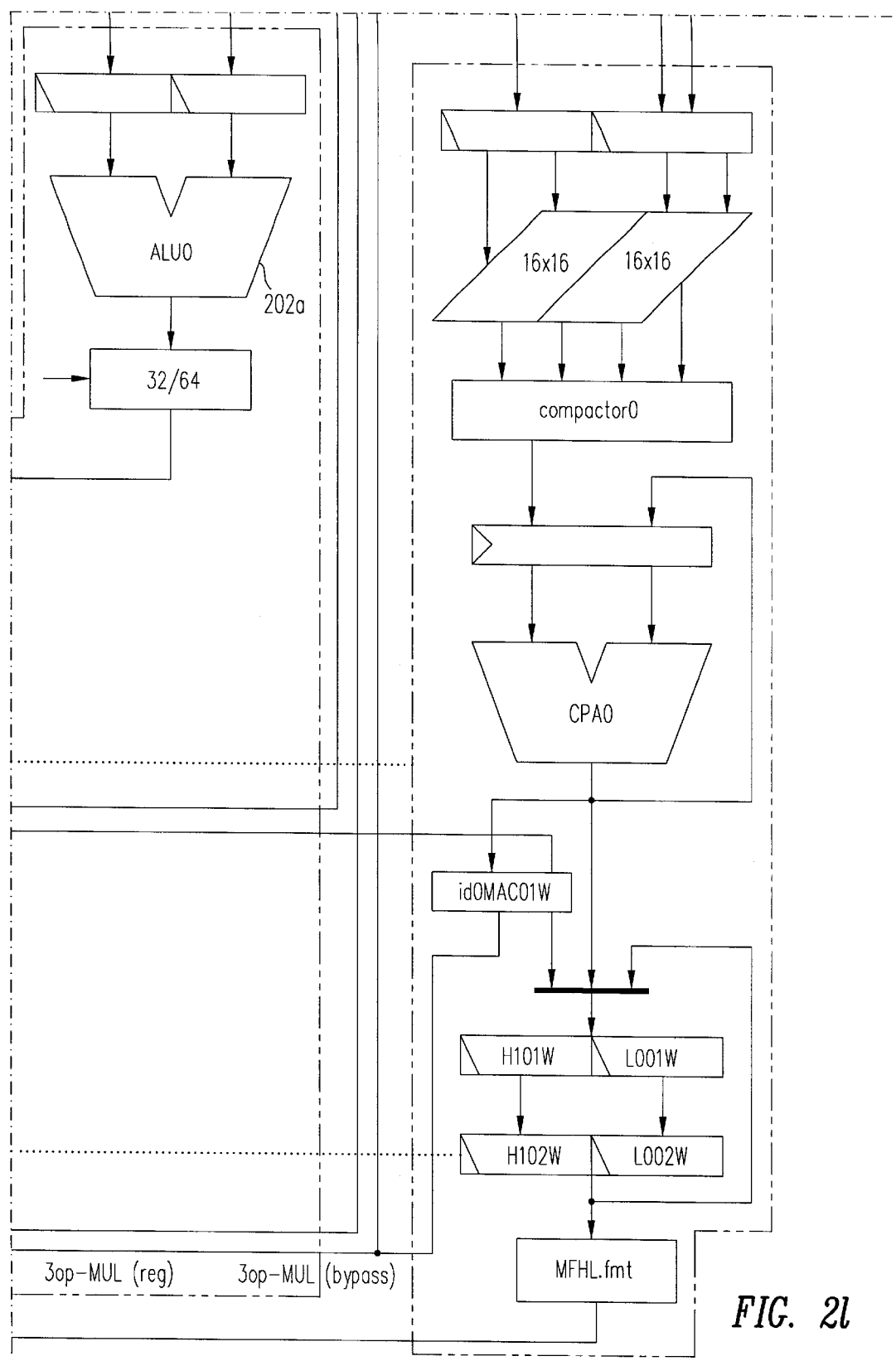
Figure 2M:
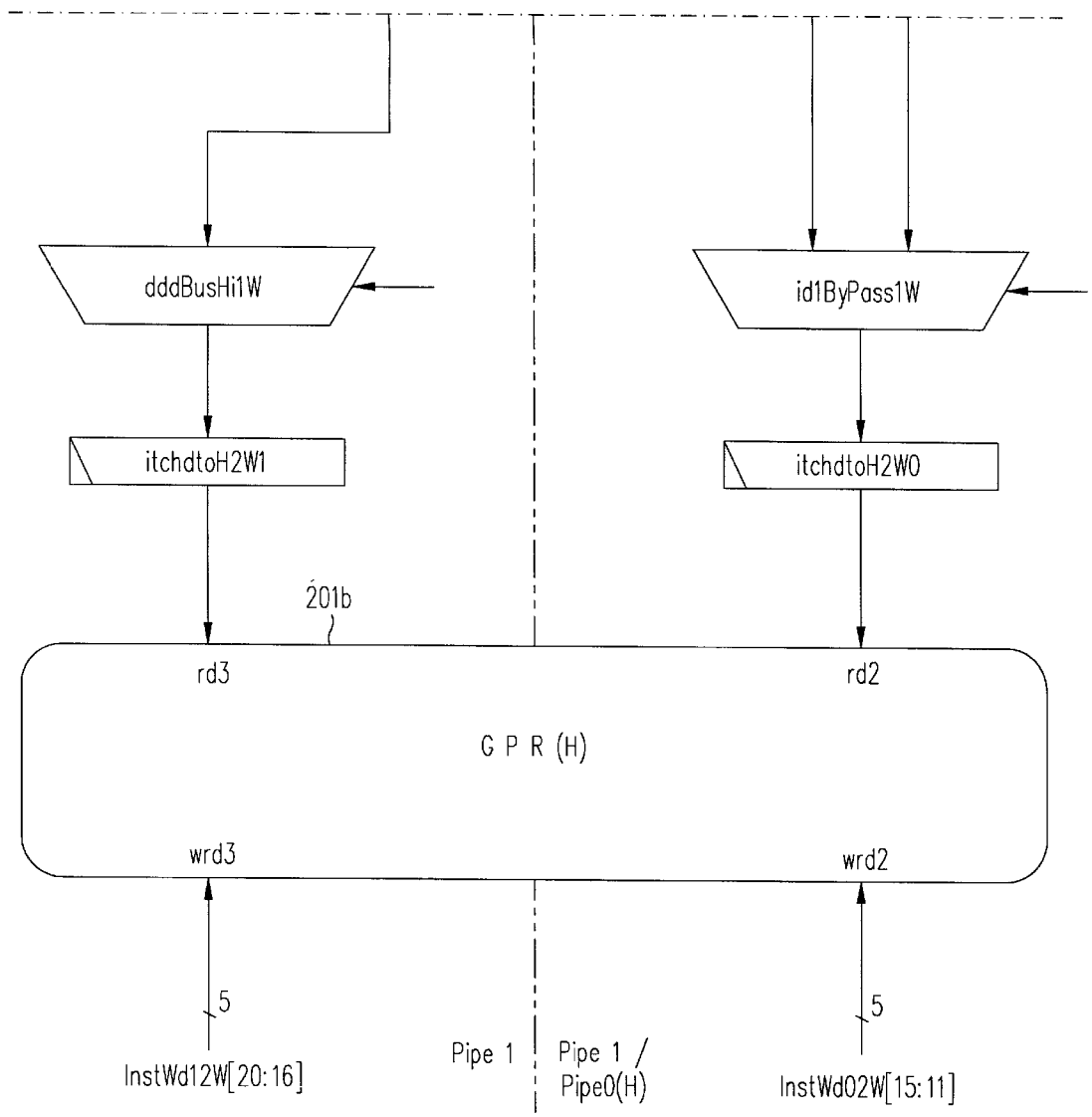
Figure 2N:
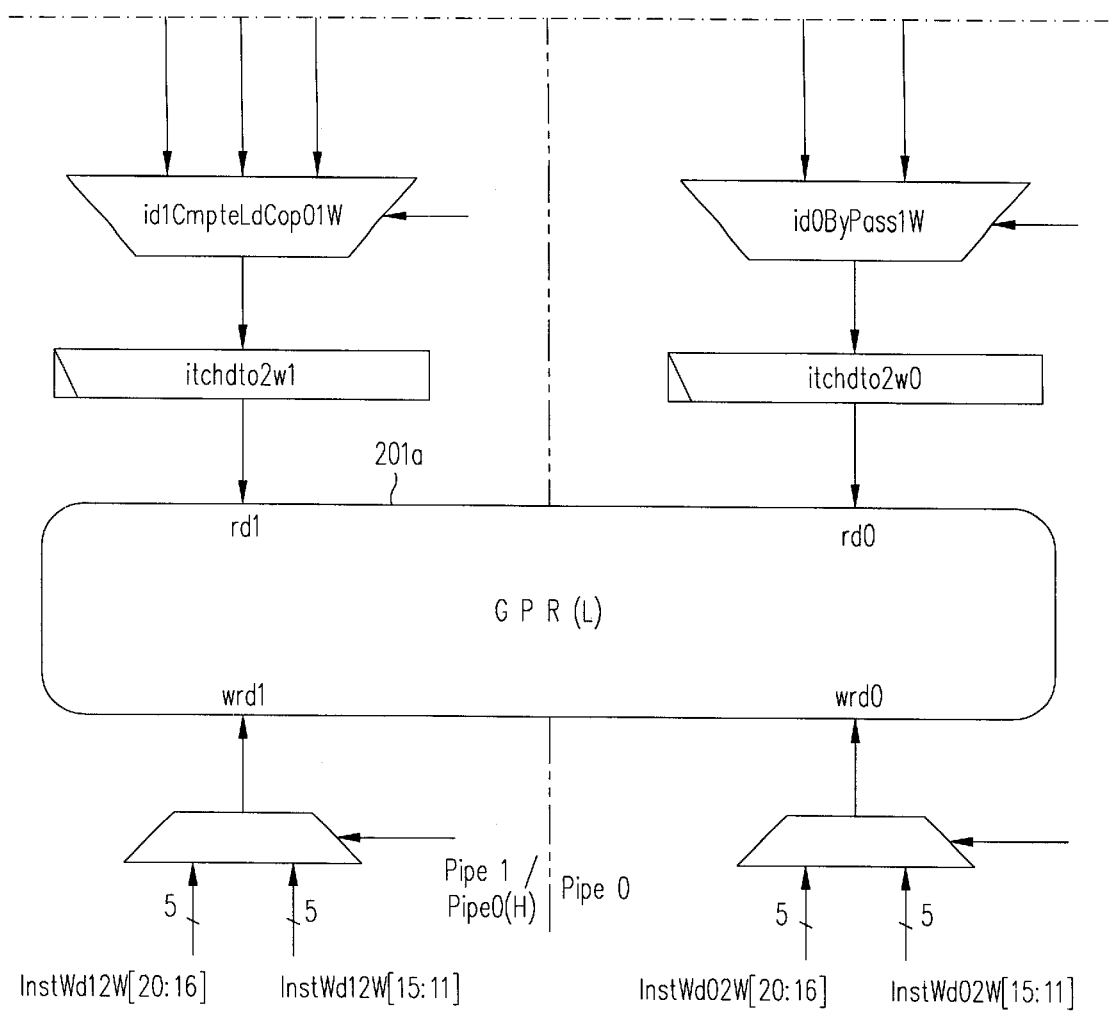

For example, a processor in accordance with this aspect of the invention may have a 64-bit (maximum) standard SISD datapath, but a 128-bit enhanced SIMD datapath. FIG. 1 is a block diagram illustrating just such a processor 100. Referring to FIG. 1, the processor 100 includes a 32×128 bit register file 102. That is, the register file includes 32 128-bit general purpose registers. The processor 100 also includes a 128-bit datapath 104. As is discussed in greater detail below, the 128-bit datapath 104 includes two 64-bit (maximum) integer pipes (106a and 106b).

The integer pipes (106a and 106b) are shown in greater detail in FIG. 2. In particular, FIG. 2 shows how a particular register 201 (including low order part 201a and high order part 201b) of the register file 102 interacts with the integer pipes 106a and 106b. Register 201 is shown in FIG. 2 for illustrative purposes only. Each integer pipe (106a and 106b) includes an arithmetic logic unit (ALU) 202a and 202b, respectively. Operand data from register parts 201a and 201b are provided to the ALU's 202a and 202b via multiplexor circuitry 204. That is, low order part 201a has four read ports 205a through 205d; and high order part 201b has three read ports 205e through 205g. These read ports 205a through 205g are connected to multiplexors 206a through 206g, respectively. As a result of this connection, and of the operation of multiplexors 206a through 206g, the contents of low order part 201a may be supplied either to integer pipe 106a (including ALU 202a) or to integer pipe 106b (including ALU 202b). Similarly, the contents of high order part 201b may be supplied either to integer pipe 106a or to integer pipe 106b. FIG. 2 shows many other features of the processor 100 which are not discussed in detail here.

As a result of the 64-bit maximum size of each integer pipe (106a and 106b), the largest integer SISD-type operation that can be processed by the processor 100 is a corresponding sixty-four bits. By contrast, controlling both integer pipes (106a and 106b) together, the processor 100 can process an aggregate 128-bit maximnum SIMD operation. Generalizing, in accordance with a basic aspect of the invention, a SISD/SIMD processor is configured such that any SISD data path size is less than the SIMD data path of which the SISD data path is a part. (It is noted that, in accordance with this aspect, only one SISD data path is required). That the SISD datapath is limited to 64 bits maximum is not seen as a limitation. Rather, there are few (if any) instances in which a 128-bit SISD integer operation would be of use anyway. Thus, to provide the capability of such an operation would not be an efficient use of a chip's real estate or cycle-time budget. By contrast, there are numerous operations (particularly vector operations, common in multimedia applications) that can benefit greatly from the 128-bit enhanced SIMD datapath.

It has been made apparent that, in the disclosed embodiment, it is the general purpose registers (in the register file 102) that are wide enough to provide an operand to an operation that uses the entire width of the SIMD datapath. That is, in the disclosed embodiment, the general purpose registers 102 are 128 bits, wide enough to hold integer operands to utilize the entire width of the 128-bit SIMD datapath 104 for integer SIMD operations. The invention is not so limited to the use of general purpose registers, however, for it is also within the scope of the invention to provide "wide" floating point registers for holding integer operands to a SIMD datapath for a SIMD operation, or to provide "wide" general purpose registers for holding floating point operands to a SIMD datapath for a SIMD operation.

Now, the integer pipes 106a and 106b are discussed in greater detail. The integer pipes (106a and 106b) are shown in greater detail in FIG. 2. As mentioned above, each integer pipe (106a and 106b) includes an ALU (202a and 202b, respectively). It has been discussed that the 128-bit SIMD datapath is comprised of the two integer pipes 106a and 106b but that, in actuality, only one of the integer pipes need be provided for SISD operations. (It would be within the scope of this aspect of the invention, also, to provide even more than two integer pipes.)

Some code sequence examples are now provided. The code sequence examples use standard MIPS ISA mnemonics, except pmulth and paddh. The pmulth and paddh instructions behave as follows:

pmulth rd, rs, rt
   rd<15..0>=rs<15..0>*rt<15..0>
   rd<31..16>=rs<31..16>*rt<31..16>
   rd<47..32>=rs<47..32>*rt<47..32>
   rd<63..48>=rs<63..48>*rt<63..48>
paddh rd, rs, rt
   rd<15..0>=rs<15..0>+rt<15..0>
   rd<31..16>=rs<31..16>+rt<31..16>
   rd<47..32>=rs<47..32>+rt<47..32>
   rd<63..48>=rs<63..48>+rt<63..48>

The angle brackets in the illustration of pmulth and paddh behavior are bit field selectors. For example, rd<15..0> specifies the 16 least significant bits of register rd.

In accordance with a further aspect of the invention, the integer pipes 106a and 106b can be exploited not only individually by a single issue of a 64-bit SISD instruction or collectively a single issue of a 128-bit SIMD instruction, but can also be exploited individually by dual sequential issue (i.e., SISD) of two 64-bit instructions. (It is also within the scope of this further aspect of the invention to provide even more than two integer pipes which can each be exploited individually by a single issue of a 64-bit SISD instruction, can collectively be exploited by a single issue of a 128-bit SIMD instruction; or can be exploited individually by sequential issue of multiple 64-bit SISD instructions.)

For example,

```
    paddsw  $1, $2,  $3        # 128-bit Pipe 0 flow
or
    daddu   $1, $2, $3         # 64-bit Pipe 0 flow
    dsrl    $1, $2, 4          # 64-bit Pipe 1 flow
```

Furthermore, the processor 100 may even issue a second 128-bit operation simultaneously with a SIMD (first) 128-bit operation, so long as the second 128-bit operation makes use of resources independent of the SIMD operation. For example, a 128-bit load/store operation can be issued in parallel with a 128-bit SIMD operation.

```
    lq $5,   var              # 128-bit Pipe 1 flow
    paddsw $1,  $2,  $3       # 128-bit Pipe 0 flow
```

Now, having described an embodiment of the invention, benefits of this architecture are discussed, in the context of an example fragment of code that computes an inner product of two eight element, 16-bit vectors as follows:

$$s_0 = x_0 c_0 + x_1 c_1 + x_2 c_2 + x_3 c_3 + x_4 c_4 + x_5 c_5 + x_6 c_6 + x_7 c_7$$

Taking a prior art SISD/SIMD machine first (one which has a limited ALU width of 64-bits), each of four 16-bit chunks can be processed as follows:

```
ld $5,    X          # $5 <- {x0, x1, x2, x3}
ld $6,    C          # $6 <- {c0, c1, c2, c3}
pmulth  $7, $5, $6   # $7 <- {x0*c0, x1*c1, x2*c2, x3*c3}
dsrl    $8, $7, 32   # $8 <- $7 >> 32
paddh   $8, $7, $8   # $8 <- {..., ..., x0*c0+x2*c2,
                     #        x1*c1+x3*c3}
dsrl    $7, $8, 16   # $7 <- $8 >> 16
add     $7, $8       # bits 15..0 of $7 stores
                     #       x0*c0+x2*c2+x1*c1+x3*c3
```

To process all eight terms with a machine limited to 64-bit SIMD, the code is expanded as follows:

```
ld $5, X[0]          # $5 <- {x0, x1, x2, x3}
ld $6, C[0]          # $6 <- {c0, c1, c2, c3}
ld $15, X[4]         # $15 <- {x, x1, x2, x3}
ld $16, C[4]         # $16 <- {c0, c1, c2, c3}
pmulth  $7, $5, $6   # $7 <- {x0*c0, x1*c1, x2*c2,
                     #        x3*c3}
dsrl    $8, $7, 32   # $8 <- $7 >> 32
paddh   $8, $7, $8   # $8 <- {..., ,..., x0*c0+x2*c2,
                     #        x1*c1+x3*c3}
pmulth  $7, $15, $16 # $7 <- {x4*c4, x5*c5, x6*c6,
                     #        x7*c3}
dsrl    $18, $7, 32  # $18 <- $7 >> 32
```

-continued

| paddh | $18, $7, $18 | # $18 <- {..., ..., x4*c4+x6*c6, |
| | | #         x5*c5+x7*c7} |
| paddh | $18, $18, $8 | |
| dsrl | $7, $18, 16 | # $7 <- $18 >> 16 |
| add | $7, $7, $18 | # bits 15 ... 0 of $7 stores |
| | | #     x0*c0+x2*c2+x1*c1+x3*c3+ |
| | | #     x4*c4+x6*c6+x5*c5+x7*c7 |

The above code sequence uses 13 instructions and 7 general registers.

Now assuming that the instructions operate on 128-bit registers. The recoded sequence of instructions with the wider registers is as follows:

| lq | $5, X | # $5 <- {x0, x1, x2, x3, x4, x5, |
| | | #     x6, x7} |
| lq | $6, C | # $6 <- {c0, c1, c2, c3, c4, c5, |
| | | #     c6, c7} |
| pmulth | $7, $5, $6 | # $7 <- {x0*c0, x1*c1, x2*c2, |
| | | #     x3*c3, x4*c4, x5*c5, |
| | | #     x6*c6, x7*c7} |
| pcpyud | $8, $7, $0 | # $8 <- $7 >> 64 |
| | | #     (shift right 4 halfwords) |
| paddh | $8, $7, $8 | # $8 <- {..., ..., ..., ..., |
| | | #     x0*c0+x4*c4, x1*c1+x5*c5, |
| | | #     x2*c2+x6*c6, x3*c3+x7*c7} |
| dsrl | $7, $8, 32 | # $7 <- $8 >> 32 |
| paddh | $7, $7, $8 | # $7 <- {..., ..., ..., ..., ..., |
| | | #     x0*c0+x4*c4 + x2*c2+x6*c6, |
| | | #     x1*c1+x5*c5 + x3*c3+x7*c7} |
| dsrl | $8, $7, 16 | # $8 <- $7 >> 16 |
| add | $7, $7, $8 | # bits 15 ... 0 of $7 stores |
| | | #     x0*c0+x4*c4 + x2*c2+x6*c6+ |
| | | #     x1*c1+x5*c5 + x3*c3+x7*c7 |

This code sequence uses 9 instructions and 4 registers, comparing very favorably with the code of 13 instructions and 7 registers of a 64-bit SIMD machine.

Other examples around this same theme are also readily shown to benefit from wide ALU SIMD operations. For example, the following code fragment from the inner loop of an MPEG video decoder benefits from 128-bit operations.

$$s_0 = x_0 c_0 + x_2 c_2 + x_4 c_4 + x_6 c_6$$

$$s_7 = x_1 c_1 + x_3 c_3 + x_5 c_5 + x_7 c_7$$

$$y_0 = s_0 + s_7$$

$$y_7 = s_0 - c_7$$

It should be noted that the examples shown are based on 128-bit-wide SIMD. Widening the register set (e.g., to some integer multiple of the base ALU width other than two–perhaps to 256 bits or 512 bits) is also a plausible and useful extension in accordance with the above-described aspects of the invention.

Figure 3:
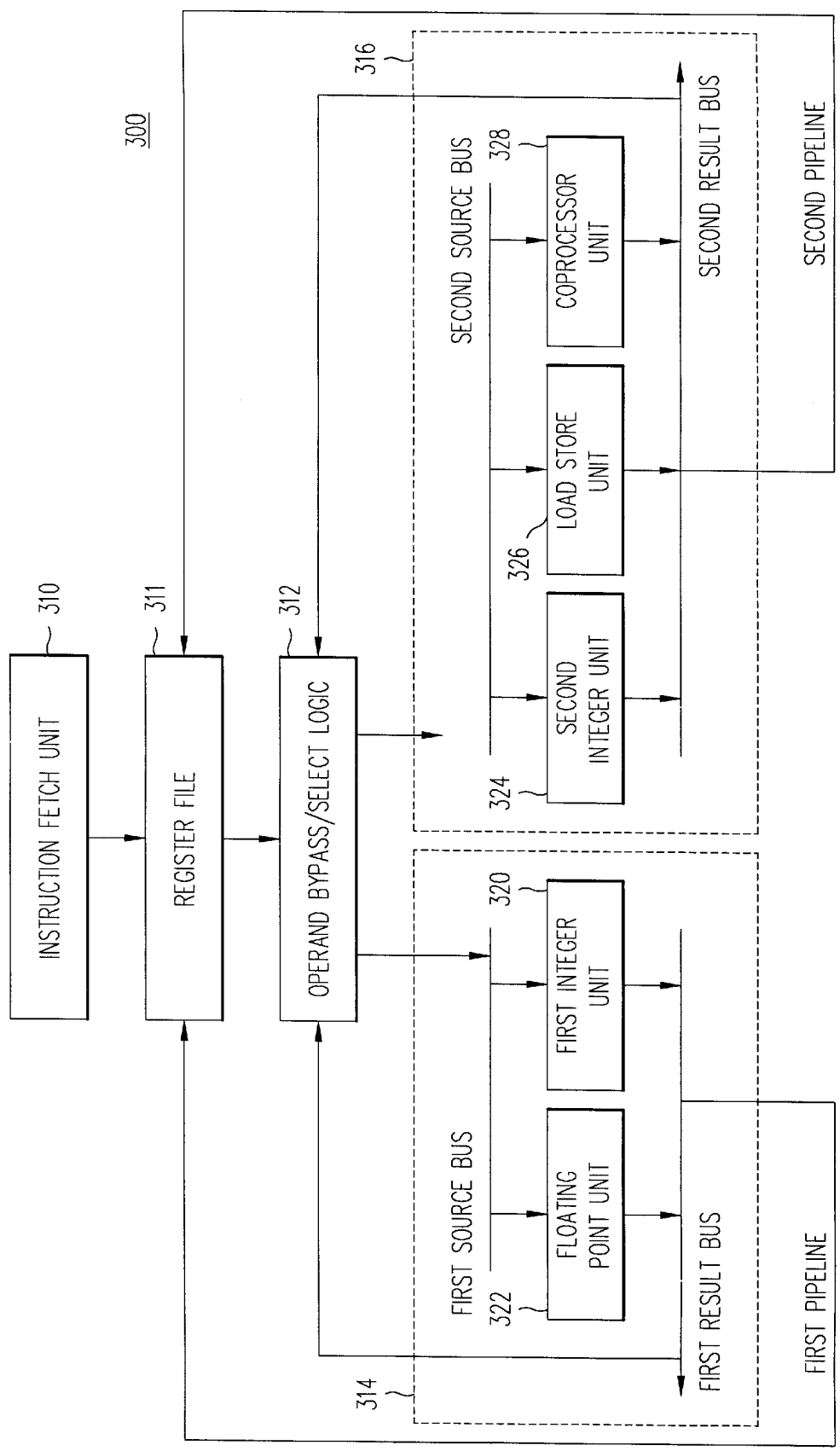
FIG. 3 is a diagram of an embodiment of a processor, the diagram particularly showing the operand system of the processor.
Figure 4:
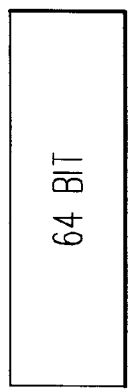
FIG. 4 is a block diagram schematically illustrating the contents of a normal ALU operating instruction and a wide ALU operating instruction executed by the processor according to the embodiment.
Figure 4:
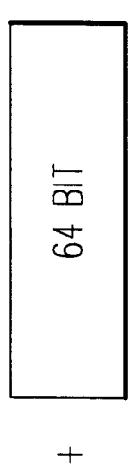
Figure 4:
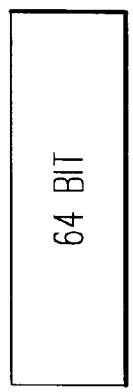
Figure 4:
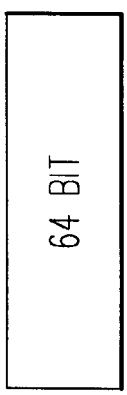
Figure 4:
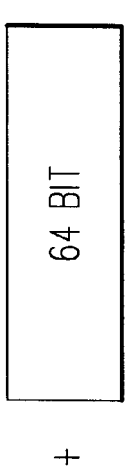
Figure 4:
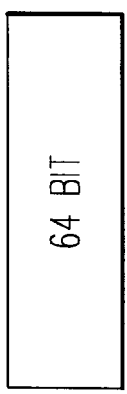
Figure 4:
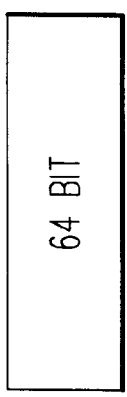
Figure 4:
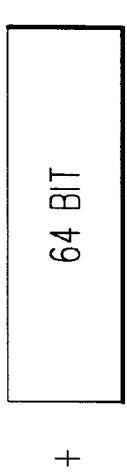
Figure 4:
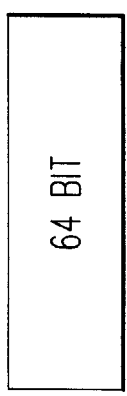
Figure 5:
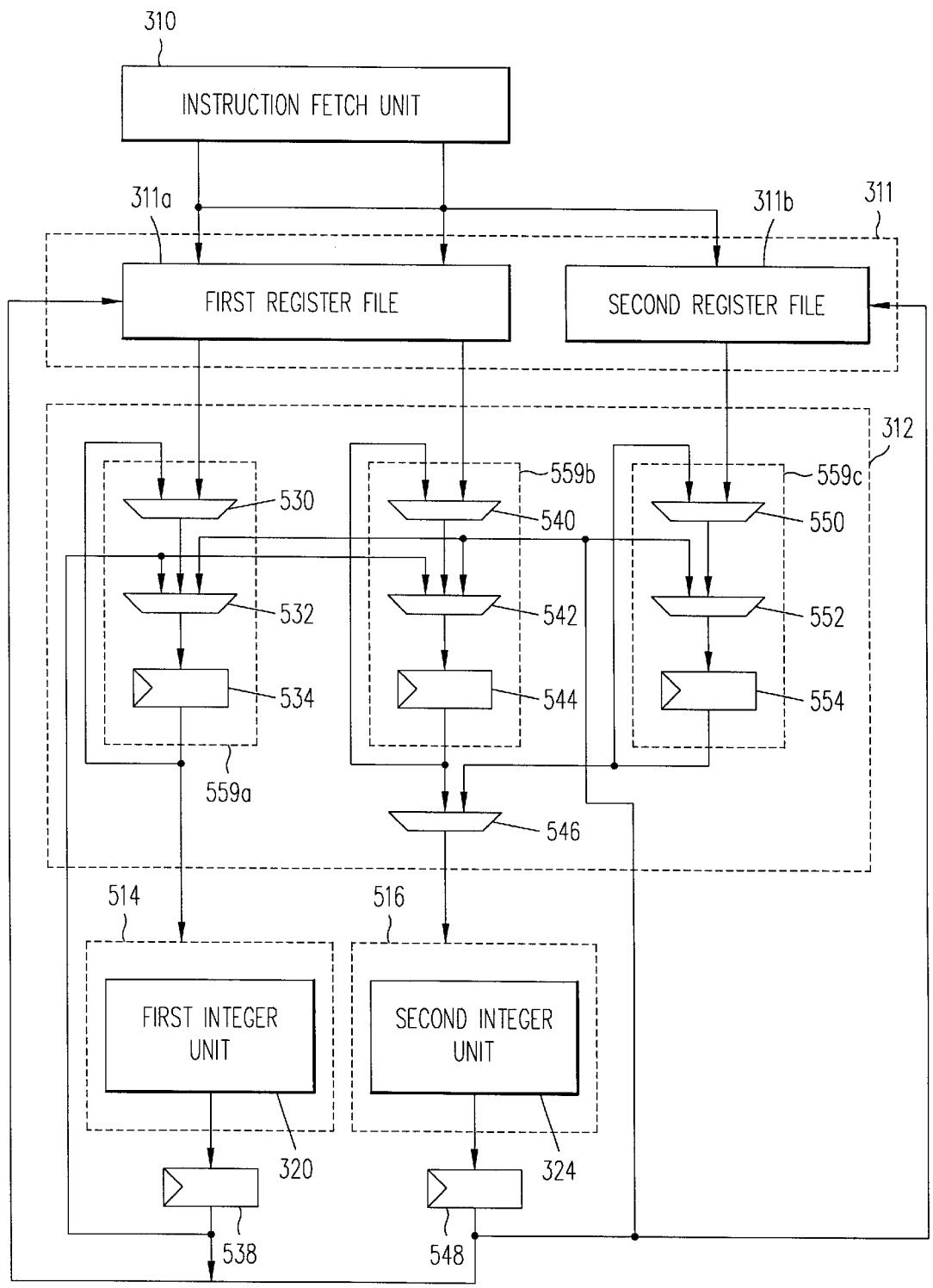
FIG. 5 is a diagram for explaining a control circuit for controlling the operand system in the processor shown in FIG. 3.

FIGS. 3 through 5 illustrate how, in accordance with one embodiment of a processor, the operands are provided for operation thereupon in response to particular ALU operating instructions. Referring now to FIG. 3, a processor 300 has "normal" ALU (arithmetic logic unit) operating instructions and "wide" ALU operating instructions. The "normal" and "wide" ALU instructions are shown schematically in FIG. 4. In the case of normal ALU operating instructions, a single instruction leads to operation of 64 bits and 64 bits to obtain an operation result of 64 bits, for example. Therefore, a normal ALU operating instruction is operated by using a single operating unit.

In case of wide ALU operating instructions, a single instruction invites two operations. That is, a single wide ALU operating instruction causes two operations to be executed simultaneously each for operation of 64 bits and 64 bits and for an operation result of 64 bits. Therefore, a wide ALU operating instruction is operated by using two operating units.

Referring to FIG. 3, two instructions are issued simultaneously from the instruction fetch unit 310. Prior to issue of an instruction, the instruction fetch unit 310 checks which operating unit can execute the fetched instruction. That is, the fetch unit 310 checks whether the floating point unit 322 can execute, first and second integer units 320, 324 can execute, the load store unit 326 can execute it, or the coprocessor unit 328 can execute it. Then, the instruction fetch unit 310 sends the instruction to an appropriate pipeline. That is, If the instruction can be executed by the floating point unit 322, then the unit 310 delivers it to the first pipeline 314. If the instruction can be executed by the load store unit 326 or coprocessor unit 328, the unit 310 delivers it to the second pipeline 316. If the instruction can be executed by the first integer unit 320 or the second integer unit 324, the unit 310 delivers it to the first pipeline 314 or the second pipeline 316, taking availability of pipelines and the kind of the paired instructions into consideration.

The embodiment, however, is configured such that a wide ALU operating instruction is given only to the first pipeline 314 and not to the second pipeline 316. In contrast, a normal ALU operating instruction can be issued to any of the first pipeline 314 and the second pipeline 316.

With reference to two instructions issued from the instruction fetch unit 310, operands necessary for executing them are read out from a register file 311. Then, these two instructions are sent to the first pipeline 314 and the second pipeline 316, where operands for respective instructions are sent to the first pipeline 314 and the second pipeline 316.

More specifically, the operands read out from the register file 311 are sent through operand bypass/select logic 312 to a first source bus and a second source bus, and then reach respective operating units.

Results of operations by respective operating units are put on a first result bus and a second result bus, respectively, and then written in the register file 311, or sent to the operand bypass/select logic 312 via operand bypasses.

In summary, the control of an operating instruction by the processor 300 can be divided as to the control of the instruction system in the operating instruction and the control of the operand system which is data for the operating instruction. With reference to FIG. 4, the control of the operand (data system) is explained in some detail.

FIG. 5 shows how the operand is sent to the first integer unit 320 and the second integer unit 16 according to the embodiment. FIG. 5 omits illustration of the floating point unit 322 in the first pipeline 314, load store unit 326 and coprocessor unit 328 in the second pipeline 316 because a wide ALU operating instruction in the embodiment is assumed to be an instruction using the first integer unit 320 and the second nteger unit 324.

As shown in FIG. 3, the register file 311 includes a first register file 311a and a second register file 311b. The first register file 311a holds operands used for normal ALU operating instructions. The second register file 311b holds a part of operands used for wide ALU operating instructions.

When instructions are issued from the instruction fetch unit 310 to the first pipeline 314 and the second pipeline 316, they are sent from the instruction fetch unit 310 also to the register file 311. More specifically, the instructions for the first pipeline and the second pipeline are sent from the instruction fetch unit 310 to the first register file 311a, and at the same time, the instruction for the first pipeline is sent to the second register file 311b. Accordingly, operands for respective instructions are read from the first register file 311a and the second register file 311b.

Interposed between the first register file 311a and the first integer unit 320 is a hold multiplexer 530, bypass multiplexer 532 and first flip-flop 534. In the destination of outputs from the first integer unit 320, a second flip-flop 538 is provided.

Interposed between the first register file 311a and the second integer unit 324 are a hold multiplexer 540, bypass multiplexer 542, first flip-flop 544 and wide multiplexer 546. In the destination of output from the second integer unit 324, a second flip-flop 548 is provided.

Interposed between the second register file 311b and the wide multiplexer 546 are a hold multiplexer 550, bypass multiplexer 552 and flip-flop 554.

The hold multiplexers 530, 540 and 550 are used for holding operands while pipelines are stalled. When they hold operands, they select the feed back loop to output therefrom. When they hold no operand, they select an output route from the register file 311.

The bypass multiplexers 532, 542, 552 are Used to form operand bypasses. That is, the bypass multiplexers 532, 542, 552 are provided to enable the use of data (bypass data), being results of operations by the first integer unit 320 and the second integer unit 324, even when these results are not written in the register file 311 Immediately after being obtained.

These hold multiplexers, 530, 540, 550, bypass multiplexers 532, 542, 552, first flip-flops 534, 544, 554, and wide multiplexer 546 make up the operand bypass/select logic 312 which the control circuit for controlling the operand system according to the embodiment.

The hold multiplexer 530, bypass multiplexer 532 and first flip-flop 534 make up a hold output circuit 559a which can switch whether the operand output from the first register file or the operand held therein should be output. The hold multiplexer 540, bypass multiplexer 542 and first flip-flop 544 make up a hold output circuit 559b which can switch whether the operand output from the first register file or the operand held therein should be output. The hold multiplexer 550, bypass multiplexer 552 and first flip-flop 554 make up a hold output circuit 559c which can switch whether the operand output from the second register file or the operand held therein should be output.

These hold output circuits 559a through 559c each hold or output two operands. That is, In the example shown in FIG. 4. the hold output circuits 559a to 559c each hold or output two operands of 64 bits. FIG. 5 shows two operands by a single line, single multiplexer and single flip-flop for simplicity.

Next referring to FIG. 5, the flow of operands are explained in different cases, namely, where (1) two normal ALU operating instructions have been issued simultaneously, (2) a normal ALU operating instruction and a wide ALU instruction have been issued simultaneously, and the wide ALU operating instruction is the earlier instruction, and (3) a normal ALU operating instruction and a wide ALU operating instruction have been issued simultaneously, and the wide ALU is the later instruction. In the explanation, all of the instructions issued from the instruction fetch unit 310 are assumed as being instructions to be executed by using the first Integer unit 320 or the second integer unit 324.

(1) When two normal ALU operating instructions are issued simultaneously

For instructions issued to the first pipeline 314 and the second pipeline 316, operands for respective instructions are read out from the first register file 311a. These two pairs of operands (four operands in total) are sent through the hold multiplexers 530, 540, and bypass multiplexers 532, 542, and held in the first flip-flops 534, 544. That is, the hold multiplexers 530, 540 select and output operands from the first register file 311a, and the bypass multiplexers 532, 542 select and output operands output from the hold multiplexers 530, 540.

These two pairs of operands held here are then sent to the first integer unit 320 and the second integer unit 324 simultaneously with instructions explained later, and are operated upon there. That is, the wide multiplexer 546 selects a pair of operands outputs from the first flip flop 544, which are operands of the first register file 311a, and outputs them to the second integer unit 324.

(2) When a normal ALU operating instruction and a wide ALU operating Instruction are issued simultaneously, and the wide ALU operating Instruction is the earlier Instruction:

A pair of operands for one of operations pursuant to the wide ALU operating instruction (first operation) are read out from the first register file 311a toward the first pipeline 314. Additionally, a pair of operands for the normal ALU operating instruction are read out from the first register file 311a toward the second pipeline 316. Furthermore, a pair of operands for the other of operations pursuant to the wide ALU operating instruction (second operation) are read out from the second register file 311b toward the second pipeline 316. Therefore, six operands in total are read out from the register file 311.

In the embodiment shown here, the wide ALU operating instruction Is given only to the first pipeline 314. Therefore, it is sufficient for the second register file 311b to be supplied only with the instruction issued to the first pipeline.

In this manner, two pairs of operands for two instructions read out from the first register file 311a are sent through the hold multiplexers 530, 540, and the bypass multiplexers 532, 542, and held in the first flip-flops 534, 544. That is, the hold multiplexers 530, 540 select and output operands from the first register file whilst the bypass multiplexers 532, 542 select and output operands output from the hold multiplexers.

The pair of operands for one instruction read out from the second register file 311b are sent through the hold multiplexer 550 and the bypass multiplexer 552, and held in the first flip-flop 554. That is, the hold multiplexer 550 selects and outputs the operands from the second register file 311b, and the bypass multiplexer 552 selects and outputs the operands from the hold multiplexer 550.

Since the instruction issued to the first pipeline 314 is a wide ALU operating instruction and the earlier instruction, operands for the wide ALU operating instruction are first given to the first integer unit 320 and the second integer unit 324. In greater detail, given to the first integer unit 320 are a pair of operands from the first flip-flop 534. That is, the first integer unit 320 is supplied with the pair of operands read out from the first register file 311a. The second integer unit 324 is supplied with a pair of operands from the first flip-flop 554. That is, given to the second integer unit 324 are the pair of operands read out from the second register file 311b. Thus, the wide multiplexer 546 selects the operands output from the first flip-flop 554, and delivers them to the second integer unit 324.

In this manner, the wide ALU operating instruction to sent to the first integer unit 320 and the second integer unit 324 under no pipeline stall. However, the normal ALU operating instruction must wait its order due to pipeline stall because the resources cannot be used. That is, although the normal ALU operating instruction is issued to the second pipeline 316, the second integer unit 324 in the second pipeline 316 is under use for execution of the wide ALU operating instruction, and the normal ALU operating instruction cannot use the second integer unit. Therefore, the normal ALU operating instruction is held in wait until execution of the wide ALU operating instruction is completed.

The pair of operands for the normal ALU operating instruction having caused pipeline stall are fed back from the first flip-flop 544 to the hold multiplexer 540. and held until the next cycle.

The pair of operands for the normal ALU operating instruction held in the hold multiplexer 540 are given to the second integer unit and executed in the next cycle. That is, in the next cycle, the hold multiplexer 540 selects the operands output from the first flip-flop 544, and outputs them to the bypass multiplexer 542. Concurrently, the next instruction is issued to the first pipeline 314, and executed in parallel with the second pipeline 316, if possible.

(3) When a normal ALU operating instruction and a wide ALU operating instruction are issued simultaneously, and the wide ALU operating instruction is the later instruction;

In the same manner as the above case (2), a pair of operands (two operands) read out from the first register file 311a for one of operations pursuant to the wide ALU operating instruction (first operation) are sent through the hold multiplexer 530 and the bypass multiplexer 532, and hold in the first flip-flop 534. A pair of operands (two operands) read out from the first register file 311a for the normal ALU operating instruction are sent through the hold multiplexer 540 and the bypass multiplexer 542, and held in the first flip-flop 544. A pair of operands (two operands) read out from the second register file 311b for the other of operations pursuant to the wide ALU operating instruction (second operation) are sent through the hold multiplexer 550 and the bypass multiplexer 552, and hold in the first flip-flop 554.

Although the instruction issued to the first pipeline 314 is a wide ALU operating instruction, it is the later instruction. Therefore, first given to the second integer unit 324 are the operands for the normal ALU operating instruction. That is, the second integer unit 324 first receives the pair of operands from the first flop 324, which are read out from the first register file 311a. As a result, the wide multiplexer 546 selects the operands output from the first flip-flop 544 and outputs them to the second integer unit 546.

In this manner, the normal ALU operating instruction is sent to the second integer unit 324 under no pipeline stall, but the wide ALU must wait due to pipeline stall because the resources cannot be used. That is, although the wide ALU operating instruction is issued to the first pipeline 314, both the first integer unit 320 and the second integer unit 324 must be used to execute the wide ALU operating instruction. However, since the second integer unit 324 is under use for the normal ALU operating instruction issued earlier, the wide ALU operating instruction cannot use the second integer unit 324. Therefore, the wide ALU operating instruction must wait until execution of the normal ALU operating instruction is completed.

These two pairs of operands (four operands) for the wide ALU operating instruction having caused pipeline stall are held until the next cycle. That is, one pair of operands read out from the first register file 311a are fed back from the first flip-flop 534 to the hold multiplexer 530, and held until the next cycle. One pair of operands read out from the second register file 311b are fed back from the first flip-flop 554 to the hold multiplexer 550 and held until the next cycle.

Then, these two pairs of operands hold in the hold multiplexers are given to the first integer unit 320 and the second integer unit 324 and executed, respectively, in the next cycle. That is, in the next cycle, the hold multiplexer 530 selects the operand output from the first flip-flop 534 and output them to the bypass multiplexer 532. The hold multiplexer 550 selects the operands output from the first flip-flop 554 and outputs them to the bypass multiplexer 552.

What is claimed is:

1. A processor, comprising:

n-bit register circuitry for holding instruction operands;

instruction decode circuitry to sequentially decode processor instructions from an instruction stream;

arithmetic logic (AL) circuitry to perform:
 a single operation on at least one m-bit operand provided from the n-bit register circuitry, responsive to a first single processor instruction decoded by the instruction decode circuitry, wherein m<n and wherein the AL circuitry is not operable to perform any single operation on an operand larger than m bits; and
 multiple parallel operations on at least two portions of an n-bit operand provided from the n-bit register circuitry, responsive to a second single instruction decoded by the instruction decode circuitry;
wherein the AL circuitry includes first m-bit integer pipe circuitry that is operable to perform the single operation on an m-bit operand and second j-bit integer pipe circuitry that is operable to perform the single operation on a j-bit operand, and wherein the AL circuitry is operable to perform m+j bit parallel operations using the first m-bit integer pipe circuitry and the second j-bit integer pipe circuitry.

2. The processor of claim 1, wherein n is 128 and m is 64.

3. The processor of claim 1, wherein m+j=n.

4. The processor of claim 3, wherein m=j.

5. The processor of claim 1, wherein the second integer pipe circuitry is also operable to perform a single processor instruction on a j-bit operand provided from the n-bit register circuitry.

6. The processor of claim 5, wherein m=j.

7. The processor of claim 3, wherein n is 128, and wherein m and j are 64.

8. The processor of claim 1, and further including:
load/store circuitry to communicate the operands between a memory and the n-bit register circuitry.

9. The processor of claim 1, wherein n is an integer multiple of m.

10. A processor comprising:

n-bit register circuitry for holding instruction operands;

instruction decode circuitry to decode processor instructions from an instruction stream; and arithmetic logic (AL) circuitry including a plurality of arithmetic logic units ($ALU_1$ to $ALU_k$), each of the arithmetic logic units $ALU_i$ (for i=1 to k) separately operable to perform a separate single operation on at least one $m_i$-bit operand provided from the n-bit register circuitry, responsive to first separate single processor instructions decoded by the instruction decode circuitry, wherein each $m_i$<n (for i=1 to k), wherein each of $ALU_i$ (for i=1 to k) is not operable to perform any single operation on an operand larger than $m_i$ bits, and wherein the sum of all $m_i$ (for i=1 to k) for the ALU's is less than or equal to n, the ALU's further being collectively operable to perform multiple parallel operations on at least two portions of one n-bit operand provided from the n-bit register circuitry, responsive to a second single instruction decoded by the instruction decode circuitry, each of the ALU's having an integer pipe circuitry each operable to perform multiple bit operation, said ALU having a plurality of integer pipe circuitries, each operable to perform multiple bit operation, wherein in the case a plurality of single operation instructions are simultaneously issued, a plurality of single operations are operated in parallel using said plurality of integer pipe circuitries, in the case a single operation instruction and said multiple parallel operation instructions are simultaneously issued and said multiple parallel operation instructions are to be operated with priority, performance of said single operation instruction is halted until performances of said multiple parallel operation instructions are completed, and in the case a single operation instruction and said multiple parallel operation instructions are simultaneously issued and said single operation instruction is to be operated with priority, performances of said multiple parallel operation instructions are halted until performance of said single operation instruction is completed.

11. The processor of claim 10, wherein said processor loads each of the ALU with corresponding operand.

12. A method of processing instructions by a processor, comprising:

holding n-bit instruction operands in n-bit register circuitry;

sequentially decoding processor instructions from an instruction stream;

a first performing step of performing a single operation on at least one m-bit operand provided from the n-bit register circuitry, responsive to a first decoded single processor instruction, wherein m<n, and not performing any single operation on an operand larger than bits; and a second performing step of performing multiple parallel operations on at least two portions of one n-bit operand provided from the n-bit register circuitry, responsive to a second decoded single instruction;

wherein the first performing step is performed by first m-bit integer pipe circuitry that is operable to perform the single operation on an m-bit operand and by second j-bit integer pipe circuitry that is operable to perform the single operation on a j-bit operand, and the second performing step is performed by the first m-bit integer pipe circuitry and the second j-bit integer pipe circuitry to perform the multiple parallel operations on an m+j bit operand.

13. The method of claim 12, wherein m+j=n.

14. The method of claim 13, wherein m=j.

15. The method of claim 12, and further comprising:

performing a single processor instruction, by the second integer pipe circuitry, on a j-bit operand provided from the n-bit register circuitry.

16. The method of claim 13, wherein m=j.

17. The method of claim 13, wherein n is 128, and wherein m and j are 64.

18. The method of claim 12, and further including:

communicating the operands between a memory and the n-bit register circuitry.

19. The method of claim 12, wherein n is an integer multiple of m.

20. The method of claim 12, wherein n is 128 and m is 64.

21. A processor comprising:

n-bit register circuitry for holding instruction operands;

instruction decode circuitry to decode processor instructions from an instruction stream; and arithmetic logic (AL) circuitry including a plurality of arithmetic logic units ($ALU_1$ to $ALU_k$), each of the arithmetic logic units $ALU_i$ (for i=1 to k) separately operable to perform a separate single operation on at least one $m_i$-bit operand provided from the n-bit register circuitry, responsive to first separate single processor instructions decoded by the instruction decode circuitry, wherein each $m_i$<n (for i=1 to k), wherein each of $ALU_i$ (for i=1 to k) is not operable to perform any single operation on an operand larger than $m_i$ bits, and wherein the sum of all $m_i$ (for i=1 to k) for the ALU's is less than or equal to n the ALU's further being collectively operable to perform multiple parallel operations on at least two portions of one n-bit operand provided from the n-bit register circuitry, responsive to a second single instruction decoded by the instruction decode circuitry.

22. The processor of claim 21, wherein each $m_i$ is equal to each other $m_i$.

23. The processor of claim 21, wherein each $m_i$ is an integer factor of n.

24. The processor of claim 21, and further including:

load/store circuitry to communicate the operands between a memory and the n-bit register circuitry.

25. The processor of claim 21, and further including:

multiplexor circuitry to selectively route separate ones of the operands to the separate ones of the ALU's.

26. A method comprising:

holding instruction operands in n-bit register circuitry;

decoding processor instructions from an instruction stream; and a first performing step of performing a separate single operation on at least one $m_i$-bit operand provided from the n-bit register circuitry, responsive to first separate single decode processor instructions, wherein each $m_i$<n (for i=1 to k), using $m_i$-bit integer pipe circuitry that is operable to perform the single operation, but not performing any single operation on an operand larger than $m_i$ bits, and wherein the sum of all $m_i$ (for i=1 to k) is less than or equal to n a second performing step of performing multiple parallel operations on at least two portions of one n-bit operand provided from the n-bit register circuitry, responsive to a second single decoded instruction using all the $m_i$-bit (for i=1 to k) integer pipe circuitries.

27. The method of claim 26, wherein each $m_i$ is equal to each other $m_i$.

28. The method of claim 26, wherein each $m_i$ is an integer factor of n.

29. The method of claim 26, and further including:
communicating the operands between a memory and the n-bit register circuitry.

30. The method of claim 26, and further including:
selectively routing separate ones of the operands for the first performing step.

31. A processor comprising:
n-bit register circuitry for holding instruction operands;
instruction decode circuitry to sequentially decode processor instructions from an instruction stream; and
arithmetic logic (AL) circuitry to perform one of:
  a single operation at least one m-bit operand provided from the n-bit register circuitry, responsive to a first single processor instruction decoded by the instruction decode circuitry, wherein m<n and wherein the AL circuitry is not operable to perform any single operation on an operand larger than m bits, and
  multiple parallel operations on at least two portions of the one n-bit operand provided from the n-bit register circuitry, responsive to a second single instruction decoded by the instruction decode circuitry;
  said AL circuitry having a plurality of integer pipe circuitries, each operable to perform multiple bit operation, wherein:
    in the case a plurality of single operation instructions are simultaneously issued, a plurality of single operations are operated in parallel using said plurality of integer pipe circuitries,
    in the case a single operation instruction and said multiple parallel operation instructions are simultaneously issued and said multiple parallel operation instructions are to be operated with priority, performance of said single operation instruction is halted until performances of said multiple parallel operation instructions are completed, and
    in the case a single operation instruction and said multiple parallel operation instructions are simultaneously issued and said single operation instruction is to be operated with priority, performances of said multiple parallel operation instructions are halted until performance of said single operation instruction is completed.

32. The processor of claim 31, wherein the AL circuitry includes first m-bit integer pipe circuitry that is operable to perform the single operation and second j-bit integer pipe circuitry that, along with the first integer pipe circuitry, is operable to perform the multiple parallel operation.

33. The processor of claim 32, wherein the second integer pipe circuitry is also operable to perform a single processor instruction on a j-bit operand provided from the n-bit register circuitry.

* * * * *